Oct. 6, 1953 J. HERTRICH 2,654,364
MINGLER
Filed Dec. 19, 1946 4 Sheets-Sheet 1

INVENTOR
JOSEPH HERTRICH
BY
Hammond & Littell
ATTORNEYS

Oct. 6, 1953   J. HERTRICH   2,654,364
MINGLER
Filed Dec. 19, 1946   4 Sheets-Sheet 2

INVENTOR
JOSEPH HERTRICH
BY
Hammond & Littell
ATTORNEYS

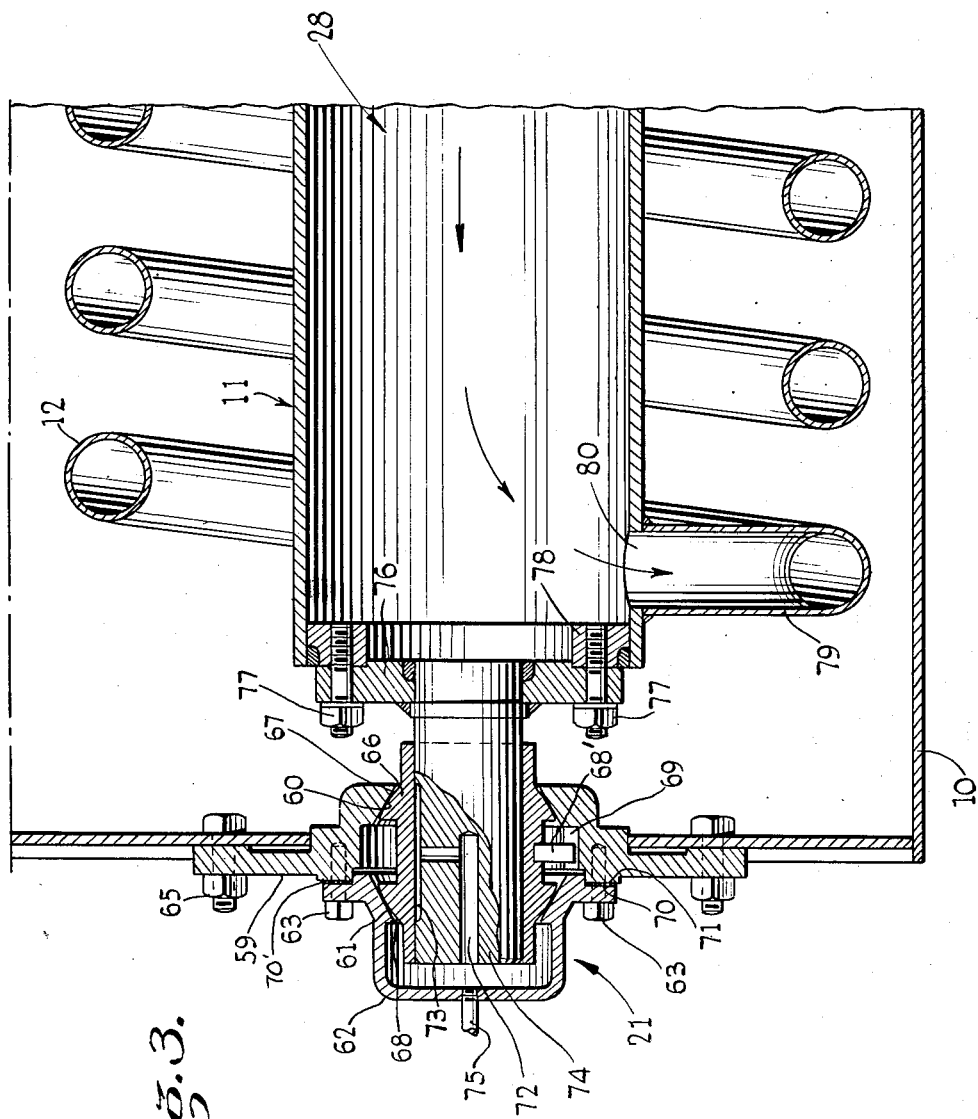

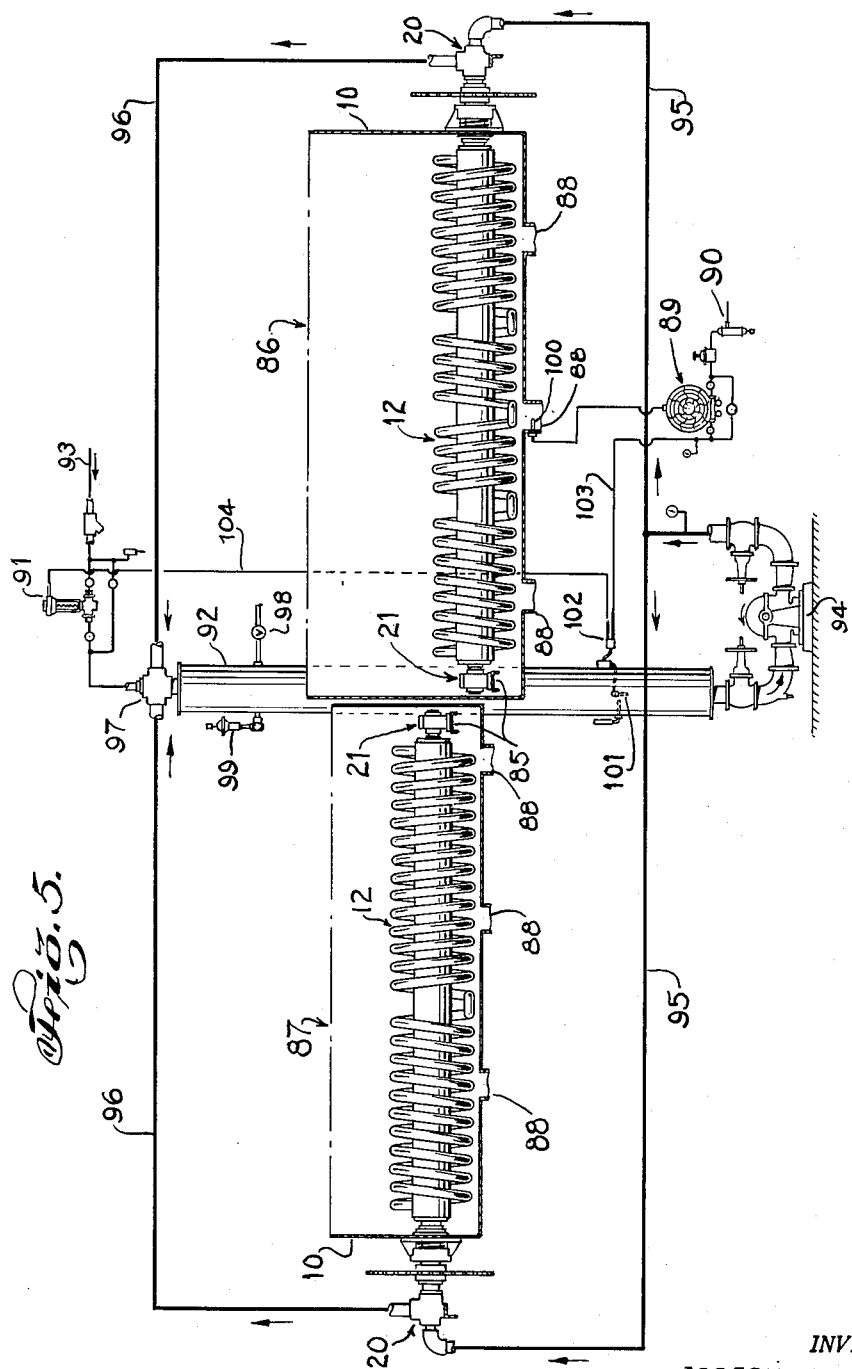

Patented Oct. 6, 1953

2,654,364

UNITED STATES PATENT OFFICE 2,654,364

MINGLER

Joseph Hertrich, Hamilton, Ohio, assignor to The Western States Machine Company, Hamilton, Ohio, a corporation of Utah Application December 19, 1946, Serial No. 717,281

8 Claims. (Cl. 127—17)

This invention relates to a mingler for temperature conditioning massecuites and magmas before centrifuging in the manufacture of sugar and the like, and more particularly is concerned with a mingler embodying an improved heat transferring and stirrer element rotatably mounted in the mingler tank by means of an improved bearing and seal arrangement.

In the manufacture of sugar, it has been found desirable, as disclosed in the United States Patent to Stevens, No. 2,086,951, to supply heat under carefully controlled conditions to the massecuite as it is passed to the centrifugal apparatus so as to decrease the viscosity of the material and to hold it uniform as it is received in the centrifugals, thus aiding the centrifuging operation.

Minglers of known types are expensive and difficult to install and maintain in efficient operation due to the construction and mounting of the heat transferring and stirrer elements.

The conventional mingler shaft is subject to such heavy loads that it tends to sag with the effect of reducing the life of the bearings and the mingler. To minimize this wear, it has been necessary to provide inboard bearing supports within the mingler tank intermediate the bearings at the ends of the heat transferring-stirrer element except in installations of unusually short length. When three or more bearings are used, the shaft will be deflected if the bearings are not aligned and thereby produce harmful stresses in the apparatus. Also, the load exerted on the mingler supports will change in accordance with the amount of sugar in the mingler and, if the foundation is not uniformly strong, the mingler may sag unevenly. When this occurs and three or more bearings are used, the shaft may be deflected due to the resultant bearing misalignment.

The end bearings in a conventional mingler are subjected or exposed to the sugar in the mingler as well as the intermediate bearings thus leading to excessive bearing wear of all of the bearings. In addition, the intermediate or inboard bearings within the tank interrupt the coils of the heat transferring and stirrer element and thus reduce its effective size.

The primary object of the present invention is to provide a mingler having an easily installed heat transferring and stirrer element with bearing supports which will have an increased life and by which the need for inboard bearings is obviated in many cases.

Another object of the invention is to provide an arrangement such that there will be no bearings to align accurately and where bending or changing of length of the shaft due to temperature differences will not result in damage to the apparatus.

According to this invention, it is not essential that the bearings exactly be in line with the mingler shaft centerline. Also, as described herein, the alignment will not be affected when the end walls of the mingler come and go with varying sugar loads, or the shaft deflects transversely or otherwise relative to an end wall. By using the construction of the present invention, the exact alignment of the flanges in the shaft assembly also loses its importance.

According to the mingler construction of this invention, a rotary mingler coil unit comprising a heavy supporting shaft having heat transferring and stirrer coils secured thereto is held at two spaced points at its opposite ends in vertically fixed positions near the planes of the adjacent end walls of a mingler tank that is to contain massecuite to be conditioned for centrifugal treatment. This supporting of the shaft is achieved by holding and sealing structures which permit the rotary unit to undergo angular (lateral deflection) and/or axial (longitudinal) movement relative to the tank walls between those vertically fixed points in response to loads, torsions, temperature changes, or other deformations or sag producing stresses encountered in the use of the apparatus. At the same time, the walls are kept completely sealed as required. Consequently, the improved minglers can be made and used without the necessity of keeping the axis or shaft of the rotary unit true to a straight line, or providing, aligning, or servicing, inboard bearings, or of requiring the precise machining and alignment of journals which is necessary in the use of several spaced shaft journals; and there is little or no danger of damage to the mingler tank or rotary coil unit from elastic deformations of the rotary unit or from "breathing" of the tank walls under stresses of use. The serviceable length of each rotary unit is limited only by the yield strength of the coil supporting shaft which can be made exceptionally large and strong inexpensively by reason of the freedom from restrictions just mentioned which allow deflection of the shaft. This increased size of the shaft gives further advantages in the increased heat transferring surface it provides and in simplifying the distribution of the water to the heat transfer unit. Also, the described structure enables the heat transferring-stirrer coils to traverse practically the entire length of the inside space of the tank where massecuite is held and conditioned for centrifugal treatment, so that uniform heat conditioning and distribution of all the massecuite delivered to the centrifugal is more readily assured.

A further object of the invention is to provide an arrangement wherein the intake and exhaust connections for the heat transfer medium are at one end so that only one stuffing box is necessary, and it is possible to arrange two minglers end to end to serve a very long mixer or other apparatus fed by the mingler combination.

Still another object of the invention is to provide an elongated heat transfer coil which will impart a substantially uniform temperature to the massecuite the entire length of the of the mingler with increased heating efficiency.

These and other objects, features, and advantages of the invention will become apparent from the detailed description of a preferred embodiment thereof which is merely exemplary.

In the drawings:

Fig. 3 is an enlarged vertical section of the left-hand bearing of Fig. 1.

Fig. 4 is a fragmentary sectional view of a modified bearing.

Fig. 5 is a schematic view of the use of two minglers together with the temperature control system for the heating medium.

Figure 1:
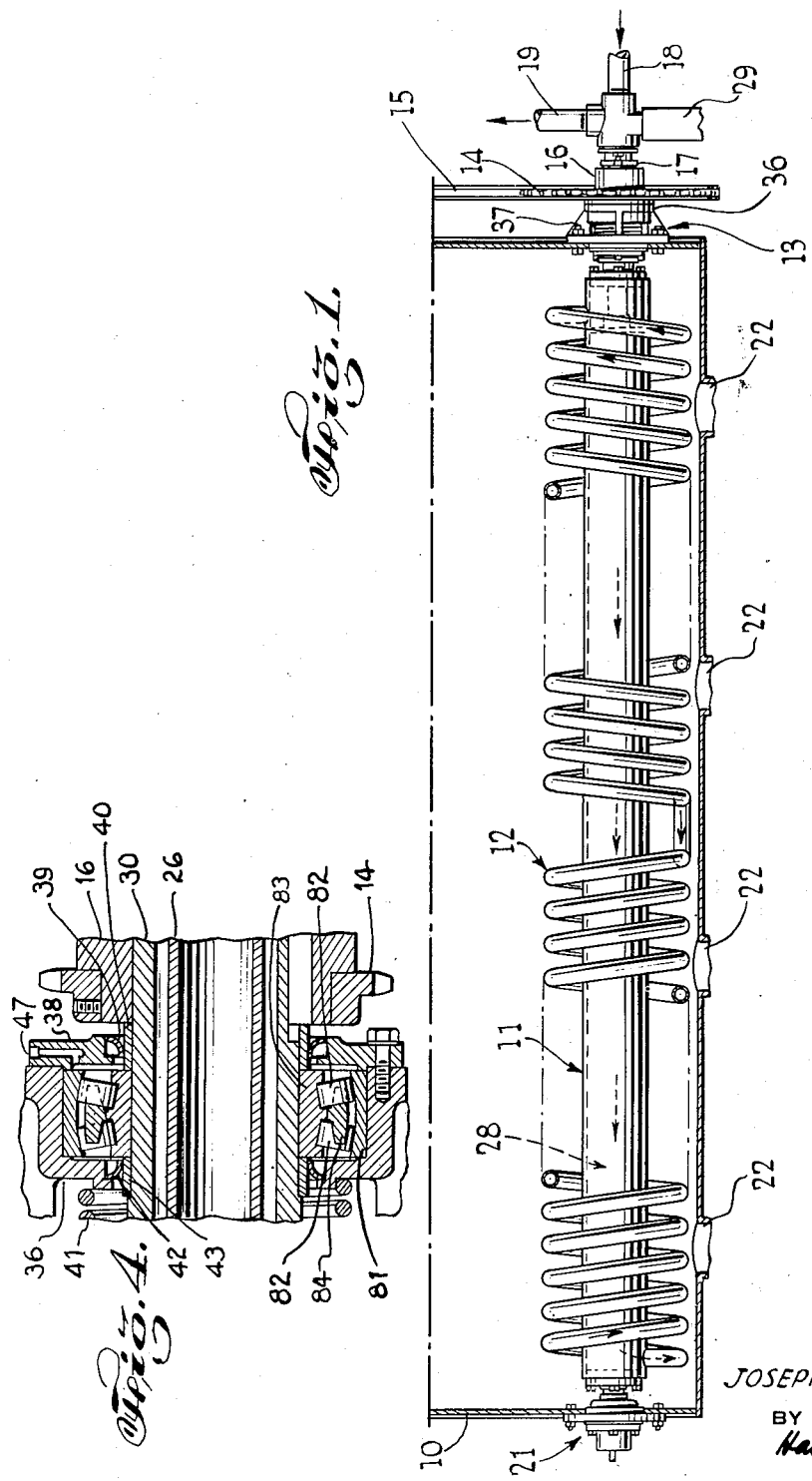
Fig. 1 is a fragmentary longitudinal elevation of the mingler partially in section.

Referring to Fig. 1, mingler tank 10 has mounted adjacent the bottom thereof a shaft 11 extending therethrough. The shaft is of such a size as to be effective as a heat exchanger element as well as a support for a heat exchanger coil 12 and also serves as a conduit for the heat transfer medium to and from a coil. The tank itself may have some suitable sectional form such as a trough-like configuration, or may be U-shaped or V-shaped, reference being made to the patents to Stevens, No. 2,086,951, and Roberts, No. 2,128,873, for examples of minglers wherein the present invention may be employed.

The shaft 11 is surrounded throughout substantially its entire length by a concentric heat transferring coil 12. A reduced extension 30 of the shaft passes through a self-aligning shaft seal arrangement 13 shown in detail in Fig. 2. The self-aligning shaft seal will automatically adjust itself to compensate for lateral deflection and for axial displacement of the shaft relative to the end wall. Shaft 11 may be rotated by sprocket 14, said sprocket being connected by means of a chain 15 with a driving means of some suitable type, hub 16 of the sprocket being held in place by lock nut 17. Pipes 18 and 19 may be connected to the heating medium distribution box 20 for the purpose of leading a heating medium into said coil and to exhaust the medium therefrom. The opposite end of shaft 11 may be supported in the self-aligning bearing 21 illustrated in detail in Fig. 3. In one form of the invention, the bearing 21 is supported by an end wall of the mingler tank, but the bearing also may be supported interiorly of the mingler housing.

As is well known in the art, mingler tank 10 may have a plurality of conduits 22 leading to the sugar centrifugals such as disclosed in the aforementioned patents to Stevens and Roberts.

Shaft 11 (Fig. 2) may be composed of a hollow pipe or tube of large diameter having a water box 23 formed at one end thereof by means of plate 24. Plate 24 has a bushing 25 welded thereto in which an inlet tube 26 is mounted, packing 27 being provided to seal water box 23 from the coil inlet passage 28 within hollow shaft 11. Inlet tube 26 extends into the distribution box 20, the water distribution box 20 being supported on a suitable post or pedestal 29. Hollow shaft extension 30 is fastened to end ring 33 by means of bolts 32 passing through ring 31, ring 31 and ring 33 being welded or fastened and sealed in some suitable manner to hollow extension 30 and the end of hollow shaft 11, respectively. Hollow extension 30 passes into distribution box 20 through a conventional sealing gland 34, and bushing 35 is provided to support the end of inlet tube 26 in box 20. Extension 30 and pipe 26 are spaced apart throughout their common length so as to provide an annular fluid passage connecting the water box 23 at the end of shaft 11 with the distribution box 20. The water distribution box 20 thus serves to distribute outlet water or heat transferring medium from the hollow shaft 11 to the outlet pipe 19, and by connecting inlet pipe 18 with tube 26 the box 20 distributes inlet water or heat transferring medium to the inlet passage 28 of shaft 11.

Mounted on one of the end walls of the mingler tank 10 is a recessed bearing guide ring 36 carried by webs 37. The recessed guide ring 36 has a cover plate 38 mounted on the outside end thereof with a cup or similar ring sealing means 39 located between shaft ring 40 and plate 38, the left-hand (Fig. 2) outer face of guide ring 36 serving as an abutment for spring 41. A second sealing ring 42 is provided between shaft ring 43 and cavity 44 of guide ring 36. It is to be noticed that the guide ring 36 and its plate 38 have annular clearance spaces 45 and 46 between the walls of the chamber or bearing race they define and the shaft extension 30. Bearing rolls 64 supporting said shaft extension are carried in said chamber, a lubricating passage for the rolls being indicated at 47.

Spring 41 urges the packing follower 48 in a direction such as to compress packing rings 49 into a sealing relationship with packing retaining ring 51 and stationary bushing 53. There is a clearance 48a between the external cylindrical surface of the packing follower 48 and the inner cylindrical surface of bushing 53, and there is a clearance 51a between the enlarged cylindrical end of the packing retaining ring 51 and the inner cylindrical surface of bushing 53. Packing retaining ring 51 is provided with an external groove or grooves 52 which engage a pin or pins 53a so as to prevent rotation of ring 51 while allowing ring 51 to undergo axial and/or angular movement relative to the plane of the end wall which supports the bushing 53. Ring 51 is pressed into tight engagement with collar 54 on shaft extension 30 by force of spring 41 acting through packing follower 48, packing rings 49, and shoulder 50 of the packing retaining ring 51. Sealing ring 55 is provided to seal the annular clearance 56 between the packing follower 48 and the shaft extension 30, and an oil or lubricating connection 58 communicating with the interior of retaining ring 51 and follower 48 may be used.

Describing the operation of self-aligning seal 13, shaft extension 30 and shaft 11 rotate with sprocket 14. Collar 54 also will rotate with the extension 30 and spring 41 will provide a tight seal between the interior of the mingler tank and the exterior thereof by forcing packing 49 into sealing relationship with the surrounding parts. In the event that shaft 11 tends to sag or have a lateral deflection, or if the mingler tank itself sags unevenly, packing retaining ring 51 nevertheless will remain seated against face 57 of collar 54, there being sufficient clearance for radial displacement of the extended shaft end between the shaft and the inner surface of ring 51, and there being also a clearance 51a between the outer cylindrical surface of the packing retaining ring 51 and the interior cylindrical surface of fixed bushing 53 to allow tilting of the packing retaining ring 51 relative to the interior wall of bushing 53. The clearance 48a between the packing follower 48 and the interior cylindrical surface of bushing 53 will allow a similar tilting movement of the follower 48. Thus the packing retaining ring 51 and packing follower 48 can have angular movement relative to the end wall of the tank as the shaft deflects laterally so as to maintain contact of the packing retaining ring 51 with face 57 of collar 54. If the shaft changes length and, therefore, collar 54 moves longitudinally relative to the plane of the end wall of the mingler tank, spring 41 will cause packing follower 48 to still compress the packing rings 49 against packing retaining ring 51, packing ring 51 in turn being maintained in contact with face 57 of collar 54. In this manner, the self-aligning shaft seal will maintain a seal between the interior of the mingler tank and exterior thereof regardless of the lateral deflection and/or longitudinal movement of the shaft; and the apparatus is able to operate reliably for the continuous stirring and heating of massecuite or magma in the mingler tank even though the shaft undergoes axial, angular and/or radial displacements relative to the walls of the tank in the course of the operations.

Figure 2:
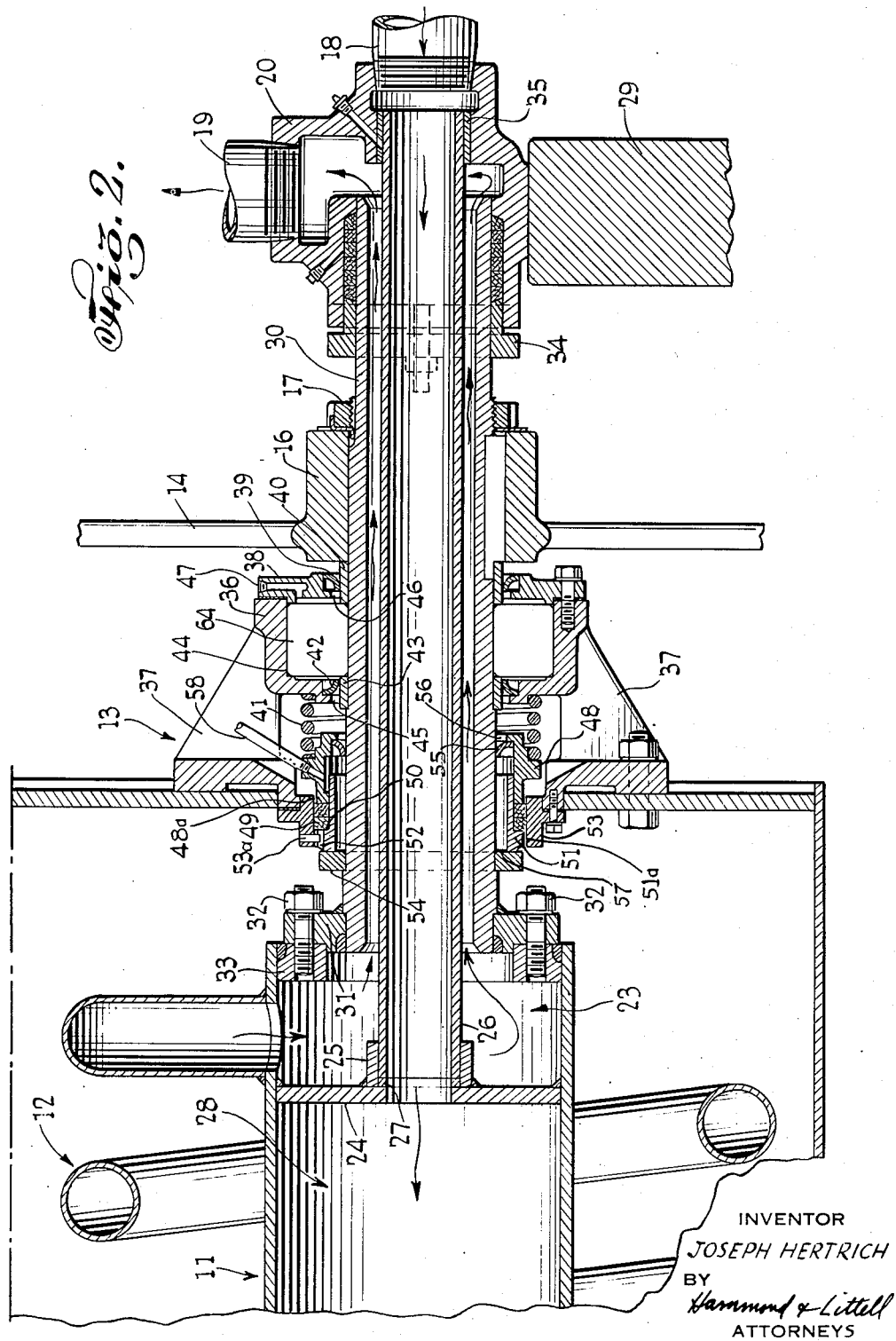
Fig. 2 is an enlarged vertical section of the right-hand support shown in Fig. 1.

In place of the rollers 64 of Fig. 2, a self-aligning type of roller bearing as seen in Fig. 4 may be used, parts in Fig. 4 similar to Fig. 2 being given identical reference numerals. Guide ring 36 carries outer race 81, said race having a spherical surface for guiding angularly disposed rollers 82. Inner race 83 is mounted on shaft extension 30 and a conventional bearing separator 84 can be employed. It will be apparent that the self-aligning roller bearing of Fig. 4 will tend to minimize stresses due to bending of the shaft inasmuch as the bearing will automatically adjust itself to compensate for lateral deflection of the shaft.

Bearing 21 at the opposite end of the shaft (Fig. 3) may be a self-aligning sealed-type bearing. The bearing includes two opposed conically-shaped bearing surfaces 60 and 61, formed, respectively, on parts of a stationary housing structure comprising mounting plate 59 and cap 62. Mounting plate 59 formed with surface 60, as shown in Fig. 3, is fastened to the end wall of the mingler tank by bolts 65. Conically-shaped bearing 61 may be integral with the sealing cap 62, said cap being fastened by means of bolts 63 to plate 59. Bearing sleeve 66, surrounding and rotatively supporting stub 74 of shaft 11, has spherically-shaped surfaces 67 and 68 arranged to mate with conical surfaces 60 and 61. Sleeve 66 may be held from rotation by means of engagement of pin 68' in groove 69 of plate 59. The bearing may be adjusted for longitudinal play and tightness by the use of shim 70' between the face 70 of sealing cap 62 and face 71 of plate 59 in a well known manner. Lubricating passage 72 communicates with groove 73 in the stub shaft 74 and may have a lubricant supplied thereto through connection 75. Stub shaft 74 may have flange 76 welded thereto, said flange 76 being arranged to be fastened by bolts 77 to flange 78 of the hollow shaft 11. The end loop 79 of coil 12 communicates through aperture 80 with the interior 28 of the hollow shaft 11.

In the event that the shaft 11 tends to sag between bearing 21 and the bearing at the opposite end, the conical surfaces of bearing 21 in conjunction with the spherically-shaped sleeve surfaces will allow the bearing to align itself automatically, a seal substantially being maintained and the massecuite or other liquid prevented from reaching the bearing surfaces. If desired, the bearing 21 may be supported interiorly of the mingler on supports 85 (Fig. 5).

Summarizing, the rotary mingler coil unit comprising a heavy supporting shaft 11 with its heat transferring and stirrer coils 12 is held at two spaced points by bearings at its opposite ends in vertically fixed positions near the planes of the adjacent end walls of the mingler tank 10. This suporting of the shaft is achieved by the holding and sealing structures, such as shown at 13 and 21, which permit the rotary unit to undergo angular (lateral deflection) and/or axial (longitudinal) movement relative to the tank walls between these vertically fixed points, and, at the same time, the end walls are maintained completely sealed. As a result, the improved minglers can be made and used without the necessity of keeping the axis or shaft of the rotary unit absolutely in a straight line, or of using inboard bearings.

One example of the use of two minglers 86 and 87 mounted end to end is seen in Fig. 5 wherein a bank of six centrifugals is served through conduits 88, massecuite being fed into said minglers from a vacuum pan or other device in a well-known manner. Said minglers 86 and 87 are similar to the mingler of Figs. 1 and 4 with the exception that the bearing 21 is supported interiorly of the mingler tank 10, although it is apparent that minglers constructed in accordance with Figs. 1 and 4 could be advantageously arranged end to end or otherwise.

A recording type temperature controller 89 of any well-known type may be used, the one illustrated using a fluid, such as air, supplied through pipe 90 for actuating the steam control valve 91. Steam may be supplied to water heating tank 92 through pipe 93 for the purpose of heating the water in tank 92. Pump 94 circulates the hot water or heat transferring fluid from tank 92 through pipes 95 to distribution boxes 20 which direct the hot water to the mingler coils. After passing through these coils and out of box 20, the outlet water is led by pipes 96 to connection 97 through which the outlet water and heating steam from pipe 93 enter water heating tank 92. Connection 98 is provided for adding water to the system as needed, relief valve 99 being used to relieve pressure therein if necessary.

Temperature responsive element 100 is located adjacent one of the massecuite outlets 88 so as to be responsive to the temperature of the massecuite ready for the centrifugals. The temperature control bulb 100 will act to control the supply of air from line 90 to line 103 and line 104 for control of steam valve 91, so that valve 91 will supply steam to water heating tank 92 as the temperature of bulb 100 goes down in response to a lowering of massecuite temperature.

Relay valve 102 is interposed between control lines 103 and 104, the relay valve 102 being operable by temperature responsive element 101 in the water heating tank. The purpose of temperature responsive element 101 and relay valve 102 is to prevent overheating of the tank 92 in the event there is no massecuite at bulb 100. In the absence of massecuite, temperature responsive bulb 100 may be at a lower temperature than that for which the controller 89 is set to maintain the massecuite, and therefore the lower temperature at the bulb 100 will result in the controller 89 furnishing air to line 102 sufficient to open the steam valve and feed more steam to the water heating tank. Temperature responsive bulb 101 will operate when the temperature in the tank rises above a predetermined value to cause relay 102 to function to prevent any more steam being admitted to the water tank. In the form shown in the drawing, relay 102, when operated by bulb 101 by too high a temperature in the water tank, will vent air line 104 to the atmosphere and thus reduce the control air pressure on the diaphragm of steam valve 91 to cut off the steam supply to the water heating tank.

By the present invention, large sized shafts may be employed with consequent increased heating surface and better velocity and flow characteristics of the heat transfer medium as it flows into the shaft and to the coils. This will help to maintain a substantially uniform temperature throughout the entire length of the mingler.

The absence of inboard bearings does away with the necessity for interrupting the coil so that an increased area may be provided in the coils themselves.

It is to be understood that variations may be made in the details of construction without departing from the spirit of the invention except as defined in the appended claims.

I claim:

1. In an apparatus for conditioning massecuite or the like, an elongated material receiving tank with end walls, an extended hollow rotatable shaft journalled adjacent said end walls, a heat transferring-stirrer coil mounted on said shaft and connected with it for the flow of fluid therebetween, one end of said shaft passing through one of said end walls, a shaft seal mounted in a frame on said end wall through which said shaft passes, said seal including a packing ring retainer having a bore of greater diameter than said shaft within which radial displacement of said shaft can take place, a packing ring follower, a packing ring between said retainer and follower, said retainer and follower having a clearance and freedom of angular and axial movement relative to said end wall, an abutment carried on said shaft for said retainer, and a spring urging said follower, packing ring, and retainer toward said abutment whereby a seal is maintained.

2. In an apparatus for conditioning massecuite or the like, an elongated material receiving tank having end walls, an extended hollow rotatable shaft journalled adjacent said end walls only, one end of said shaft passing through one of said end walls, said shaft having a heat transferring-stirrer coil mounted thereon and connected therewith for the flow of fluid therebetween, a self-aligning shaft seal mounted on said end wall through which said shaft passes automatically adjustable to compensate for deflection of said shaft relative to said wall, said shaft seal including a collar on said shaft, a packing retainer having a bore of greater diameter than said shaft and through which said shaft passes, said retainer being adapted to abut said collar, a packing follower, said retainer and follower being mounted on said end wall and having freedom of angular and axial movement relative to said end wall, a packing ring carried between said retainer and follower, and a spring urging said retainer, ring and follower toward said collar, said retainer remaining aligned and in contact with said collar when said shaft deflects relative to said end wall, whereby a seal is maintained.

3. A self-aligning shaft seal and bearing automatically adjustable to compensate for shaft deflection including a frame, a self-aligning bearing carried by said frame, a packing retainer mounted in said frame and having a bore of greater diameter than a shaft to be mounted therein and within which deflection of the shaft can take place, a packing follower, a packing ring between said retainer and follower, said retainer and follower being spaced from and having freedom of angular and axial movement relative to said frame, and a spring adapted to urge said follower, packing ring and retainer toward an abutment adapted to be mounted on the shaft whereby a seal can be maintained under both angular and axial deflection conditions.

4. In an apparatus for conditioning massecuite or the like, an elongated material receiving tank having end walls, an extended hollow shaft journalled in vertically fixed positions adjacent said walls only, one end of said shaft passing through one of said end walls, a frame adapted to be inserted in said first end wall of said tank, a packing retainer mounted in said frame and having a bore of greater diameter than said shaft and within which radial displacement of the shaft can take place, a packing follower, a packing ring between said retainer and follower, said retainer and follower being spaced from and having freedom of angular and axial movement relative to said frame and end wall, a spring adapted to urge said follower, packing ring, and retainer toward an abutment mounted on the shaft so as to maintain a seal under both angular and axial deflection conditions of the shaft, a self-aligning bearing carried by said frame having elements movable so that the bearing remains aligned with the shaft, a self-aligning bearing supporting the other end of said shaft adjacent the other end wall of the tank, a heat transferring-stirrer coil extending along said shaft and mounted thereon, and conduit means in said shaft adapted to receive and to circulate heat transfer medium to and from said coil through the end of said shaft passing through said first mentioned end wall.

5. In an apparatus having spaced end walls or the like, the combination comprising an extended rotatable shaft journalled adjacent said end walls only, one end of said shaft passing through one of said end walls, a shaft seal mounted in a frame on said end wall through which said shaft passes, said shaft seal including a packing ring retainer and a packing ring follower, packing ring means between said retainer and follower, said retainer and follower having clearance and freedom of angular and axial movement relative to said end wall, a collar-like abutment carried on said shaft cooperating with said retainer, and spring means urging said follower, packing ring, and retainer toward said abutment, so that a seal is maintained irrespective of angular and axial movement of said shaft relative to said end wall.

6. In a device for sealing the space between the wall of a container and a shaft passing therethrough, a packing ring retainer to encompass said shaft and having a bore of greater diameter than said shaft to permit radial displacement therebetween, a packing ring to encompass said shaft and seal the space between the packing ring retainer and the wall, a packing ring follower to encompass said shaft, an annular abutment to be carried by said shaft presenting an even end face for sliding engagement with an end of the packing ring retainer so as to seal the space between the shaft and the packing ring retainer, and means for resiliently urging the packing ring follower, the packing ring, and the packing ring retainer respectively toward the abutment so as to seal the space between the shaft and the wall.

7. In a mingler for controlling the temperature of sugar massecuites and magmas, an elongated container to hold a varying volume of the material and susceptible to sagging and expansion under varied loads, a heavy rotary shaft traversing substantially the full length of the container and having at least one end extended through one end wall of the container, bearings supporting said shaft at its opposite ends, a heat-transferring stirrer coil extending along said shaft and mounted thereon for rotation thereby within the material, conduit means extending through said extended end of said shaft and connected with ends of said coil for circulating a heat transfer fluid into and from the coil, said shaft being subject to axial, angular and radial displacements relative to the container walls in the course of the mingler operations, the supporting bearing for said extended end of the shaft being disposed outside the container beyond said one end wall, the supporting bearing for the other end of said shaft being a self-aligning bearing, and a self-aligning seal interposed between said one end wall and said extended end, said seal including a collar on said shaft, means having a bore of greater diameter than said shaft and through which said shaft passes, said means abutting said collar and having a freedom of angular and axial movement relative to said end wall, and a spring urging said means against said collar whereby a seal is maintained, said means remaining aligned and in contact with said collar when said shaft deflects relative to said end wall.

8. In a mingler for controlling the temperature of sugar massecuites and magmas, an elongated container to hold a varying volume of the material and susceptible to sagging and expansion under varied loads, a heavy rotary shaft traversing substantially the full length of the container and having at least one end extended through one end wall of the container, bearings supporting the shaft at its opposite ends, a heat-transferring stirrer coil extending along said shaft and mounted thereon for rotation thereby within the material, conduit means extending through the extended end of said shaft and connected with ends of said coil for circulating a heat transfer fluid into and from the coil, said shaft being subject to axial angular and radial displacements relative to the container walls in the course of the mingler operations, the supporting bearing for the extended end of the shaft being a non-self-aligning radial bearing supported by and in spaced relation to said one end wall outside the container, the supporting bearing for the other end of said shaft being a self-aligning bearing, and a self-aligning seal interposed between said one end wall and the said extended end, said seal including elements between the shaft and said one wall relatively movable in sealed relation in axial, angular and radial directions so as to keep the mingler fully operative notwithstanding such relative displacements.

JOSEPH HERTRICH.

References Cited in the file of this patent

UNITED STATES PATENTS

| Number | Name | Date |
|---|---|---|
| 1,213,879 | Jensen | Jan. 30, 1917 |
| 1,271,153 | Gapko | July 2, 1918 |
| 1,421,918 | Dake | July 4, 1922 |
| 1,425,635 | Dod | Aug. 15, 1922 |
| 1,787,459 | Tawressy | Jan. 6, 1931 |
| 2,128,873 | Roberts | Aug. 30, 1938 |
| 2,175,233 | Vaughan | Oct. 10, 1939 |
| 2,254,386 | Olcott | Sept. 2, 1941 |
| 2,433,839 | Ferguson et al. | Jan. 6, 1948 |

FOREIGN PATENTS

| Number | Country | Date |
|---|---|---|
| 14,599 | Great Britain | July 15, 1905 |
| 266,479 | Great Britain | Mar. 3, 1927 |